(12) United States Patent
Wang et al.

(10) Patent No.: US 11,980,216 B2
(45) Date of Patent: May 14, 2024

(54) STABILIZED RICE ALEURONE AND PREPARATION METHOD THEREOF

(71) Applicants: Jiangsu State Farm Cereals Industry Group Co., Ltd., Nanjing (CN); Jiangnan University, Nanjing (CN); Jiangsu Provincial Agricultural Reclamation and Development Co., Ltd., Nanjing (CN)

(72) Inventors: Li Wang, Wuxi (CN); Hui Lu, Nanjing (CN); Zhicun Xu, Nanjing (CN); Zhengxing Chen, Wuxi (CN); Zhaoqin Zong, Nanjing (CN); Yongfu Li, Wuxi (CN); Xiaoyu Feng, Nanjing (CN); Jie Jiang, Wuxi (CN); Congnan Zhang, Nanjing (CN); Haifeng Xu, Nanjing (CN); Ru Feng, Nanjing (CN)

(73) Assignees: JIANGSU STATE FARM CEREALS INDUSTRY GROUP CO., LTD., Nanjing (CN); JIANGNAN UNIVERSITY, Wuxi (CN); JIANGSU PROVINCIAL AGRICULTURAL RECLAMATION AND DEVELOPMENT CO., LTD., Nanjing (CN)

( * ) Notice: Subject to any disclaimer, the term of this patent is extended or adjusted under 35 U.S.C. 154(b) by 466 days.

(21) Appl. No.: 17/117,051

(22) Filed: Dec. 9, 2020

(65) Prior Publication Data
US 2021/0120850 A1    Apr. 29, 2021

(30) Foreign Application Priority Data
Oct. 10, 2019  (CN) .......................... 201910958800.7

(51) Int. Cl.
*A23L 7/10* (2016.01)
*A23L 3/48* (2006.01)
(Continued)

(52) U.S. Cl.
CPC ............... *A23L 7/115* (2016.08); *A23L 3/485* (2013.01); *A23L 5/23* (2016.08); *B02C 23/20* (2013.01); *B07B 4/025* (2013.01); *A23V 2002/00* (2013.01)

(58) Field of Classification Search
CPC ... A23V 2250/5106; A23L 7/115; A23L 7/10; A23L 7/00; A23L 7/152; A23L 5/32;
(Continued)

(56) References Cited

U.S. PATENT DOCUMENTS 8,029,843 B2 * 10/2011 Bohm .................... A23L 7/198
426/459

FOREIGN PATENT DOCUMENTS

SU      1117013 A  * 10/1984

OTHER PUBLICATIONS

SU-117013 A, English Abstract Translation (Year: 1984).*

* cited by examiner

*Primary Examiner* — Hong T Yoo
(74) *Attorney, Agent, or Firm* — IPRO, PLLC

(57) ABSTRACT

The disclosure discloses stabilized rice aleurone and a preparation method, using the technology of classifying a rice aleurone layer by a tangential injection airflow impeller classifier combined with an ultrasonic vibrating screen for the first time, and simultaneously uses steam treatment coupled with thermal enzyme inactivation by drum drying as a stabilization method to prepare the stabilized rice aleurone for the first time. The drum drying equipment realizes the two purposes of enzyme inactivation and drying, and the (Continued)

method has the advantages of short process flow, simple equipment, high utilization rate, small floor space, low investment, low energy consumption and no pollution, and is suitable for industrial promotion. The stabilized rice aleurone has high nutritional value, is rich in functional ingredients, and can be used as a raw material for functional food development in industrial production and food applications.

15 Claims, 7 Drawing Sheets

(51) Int. Cl.
*A23L 5/20* (2016.01)
*B02C 23/20* (2006.01)
*B07B 4/02* (2006.01)

(58) Field of Classification Search
CPC .... B02B 5/02; B02B 3/00; B02B 1/00; B02B 1/04; B02B 1/02; B02B 1/08
See application file for complete search history.

STABILIZED RICE ALEURONE AND PREPARATION METHOD THEREOF

TECHNICAL FIELD

The disclosure belongs to the technical field of food processing, and particularly relates to stabilized rice aleurone and a preparation method thereof.

BACKGROUND

A large amount of rice bran is produced during rice processing. Rice bran is mainly composed of pericarp, seed coat, perisperm, an aleurone layer and embryo, wherein the aleurone layer is located between the seed coat and endosperm and is part of the rice bran, accounting for 7% to 9% of the total seed mass. The physiologically active ingredients with high nutritional value in paddy, such as dietary fiber, minerals, beneficial lipids, vitamins, phenolic acids and lignans, are concentrated in the aleurone layer; and 20% pure aleurone layer is equivalent to the nutrition of whole grains. The aleurone layer contains more than 100 types of biologically active factors such as oryzanol, squalene, lipopolysaccharide, tocopherol and γ-aminobutyric acid, has the functions including regulating blood sugar, preventing cardiovascular and cerebrovascular diseases, resisting fatigue and oxidation, and preventing tumors, and has broad prospects for development and application in the fields of disease prevention and health care.

Rice aleurone is a component separated from rice bran, a by-product of rice processing, through grading utilization technology. Rice aleurone contains an aleurone layer and a sub-aleurone layer as the main ingredients, and is the nutritional essence of paddy. Rice aleurone is rich in fat, as well as peroxidase and lipase. In the process of paddy processing, after the integrity of the paddy is destroyed, the peroxidase and lipase are activated, and can quickly decompose the fat in the rice aleurone and decompose triglycerides into free fatty acids, causing rancidity and deterioration of the rice aleurone. Studies have reported that fresh rice aleurone will be rancid quickly if not effectively treated within 6 h. After 24 h, the free fatty acid content will reach 7-8%, and will increase at a rate of 5% per day. Therefore, in order to extend the storage time of rice aleurone and carry out in-depth development, it is necessary to stabilize the rice aleurone.

At present, the prior art mainly focuses on the investigation of the stabilization methods for rice bran, and there are few reports on the grading and edible development and utilization study of the rice aleurone and the stabilization treatment methods. In addition, the currently reported methods used in rice bran stabilization treatment mainly include heat treatment method, chemical treatment method, biological enzyme method and extrusion method. Although these methods can partially stabilize the rice bran, the treated rice bran can only be stored for 1-2 months due to the insufficient inhibition rate of lipase and peroxidase activity. The treatment of rice aleurone by the above methods has a short stabilization period and cannot be applied to the industrial development of rice aleurone. Among them, several methods of stabilizing rice bran have been reported as follows:

Heat treatment method: The heat treatment method denatures and inactivates the lipase and peroxidase in the rice bran by heating, and at the same time kills the microorganisms in the rice bran to achieve the purpose of stabilizing the rice bran. At present, the technology is limited by the heating temperature and heating method of material, the storage period is only about half a month, and the purpose of stabilization still cannot be achieved.

Chemical treatment method: The chemical treatment method is to add chemical reagents to rice bran to change the pH and ionic strength of rice bran, so that the activity of lipase and peroxidase in rice bran is inhibited to achieve the purpose of stabilizing rice bran. However, the addition of the chemical reagents limits the application of rice bran in the food field.

Biological enzyme method: The biological enzyme method uses biological enzymes to inactivate lipase and peroxidase in rice bran to achieve the purpose of stabilizing rice bran. The principle is to use plant proteases to inactivate the naturally existing lipase in rice bran. The disadvantages of the biological enzyme method are that the production cost is too high, the enzyme activity is unstable and easy to decline to cause instability of the rice bran, and at the same time, the process has high requirements on equipment.

Extrusion method: The current extrusion method is relatively mature and can inhibit the activity of lipase and peroxidase in rice bran. The extrusion method is divided into single screw extrusion and twin screw extrusion. Single screw extrusion has the mechanical effects of only extrusion and friction on the material, and lacks the effects of mixing, shearing and high temperature, resulting in the storage period of stabilized rice bran not exceeding 2 months. Twin screw extrusion has the effects of extrusion, friction, shearing, mixing and high temperature, and the storage period is greatly extended. However, due to the denaturation of the product by extrusion, the taste is not good, and edible utilization and development of the product are limited.

It can be seen that when applied to the stabilization of rice aleurone, the currently reported rice bran stabilization method has the disadvantages that the product is unstable, the storage period is not long enough, the production cost is high, and the process is difficult to control, not suitable for industrial production and not suitable for application in the food field, thereby limiting edible development and utilization of rice aleurone.

SUMMARY

The disclosure discloses a method for preparing stabilized rice aleurone, and the method includes the following steps:
(1) extraction of rice aleurone: after rice hulling and mechanical rice milling of paddy, rice and rice bran are obtained; the rice bran is classified into an aleurone component mainly including an aleurone layer and a non-aleurone component mainly including a non-aleurone layer by a tangential injection airflow impeller classifier, and the aleurone component is further classified by an ultrasonic vibrating screen to obtain crude rice aleurone;
(2) the crude rice aleurone obtained in step (1) is mixed with water, and then steamed;
(3) the crude rice aleurone after the steam treatment is beaten with water to obtain a rice aleurone slurry; and
(4) the rice aleurone slurry is added to a drum scraper dryer for performing drying, and then the dried rice aleurone is crushed to obtain a rice aleurone product.

In one embodiment of the disclosure, the rice bran separation adopts a mechanical milling method to obtain rice and rice bran components in step (1).

In one embodiment of the disclosure, the separation method of the aleurone component and the non-aleurone component in rice bran adopts a classification method using a tangential injection airflow impeller classifier in step (1).

In one embodiment of the disclosure, the aleurone component is further classified using an ultrasonic vibrating screen to obtain rice aleurone in step (1).

In one embodiment of the disclosure, the rice aleurone classified by the tangential injection airflow impeller classifier and the ultrasonic vibrating screen in step (1) is slightly yellow in color, has obvious bran smell, and contains the nutrients with the content as follows: protein≥15%, dietary fiber≥9%, vitamin B1≥11.0 mg/kg, GABA≥590 mg/kg, phosphorus≥13000 mg/kg, calcium≥530 mg/kg, and magnesium≥6800 mg/kg.

In one embodiment of the disclosure, the amount of water added is 5%-15% of the mass of the rice aleurone in step (2).

In one embodiment of the disclosure, the steam treatment is to treat rice aleurone with a distribution thickness of 1-5 cm in step (2). The steam temperature during the steam treatment is controlled at 95° C.-120° C., and the steam treatment time is 20-40 min.

In one embodiment of the disclosure, the mass concentration of the rice aleurone slurry is 25%-50% in step (3).

In one embodiment of the disclosure, the beating process also includes colloid milling treatment to obtain a more delicate rice aleurone slurry in step (3).

In one embodiment of the disclosure, the steam pressure of the drum scraper dryer is 0.6-0.8 Mpa, and the motor speed is 50-300 rpm in step (4).

In one embodiment of the disclosure, an ultrafine pulverizer is used for performing pulverization in step (4), and the pulverization fineness is 100-300 meshes.

In one embodiment of the disclosure, the stabilized rice aleurone obtained by ultrafine pulverization in step (4) is slightly yellow in color, has a baking aroma, and contains the nutrients with the content as follows: protein≥16%, dietary fiber≥10%, vitamin B1≥11.0 mg/kg, GABA≥599 mg/kg, phosphorus≥13300 mg/kg, calcium≥520 mg/kg, and magnesium≥6700 mg/kg, and the nutrients change a little before and after stabilization.

In one embodiment of the disclosure, the mechanical rice milling process includes a process with "four emery rolls", "three emery rolls and one iron roll", "two emery rolls and two iron rolls", "one emery roll and three iron rolls", or "four iron rolls", wherein the "emery roll" refers to an emery roll rice mill, and the "iron roll" refers to an iron roll rice mill. In addition to the above five combined processes, the mechanical rice milling process also includes other combined processes of emery roll rice mills and iron roll rice mills.

Specifically, the process with "four emery rolls" refers to milling treatment with emery roll rice mills for four times; the process with "three emery rolls and one iron roll" refers to milling treatment with emery roll rice mills for 3 times and milling treatment with an iron roll rice mill for 1 time; the process with "two emery rolls and two iron rolls" refers to milling treatment with emery roll rice mills for 2 times and milling treatment with iron roll rice mills 2 times; the process with "one emery roll and three iron rolls" refers to milling treatment with an emery roll rice mill for 1 time and milling treatment with iron roll rice mills for 3 times; and the process with "four iron rolls" refers to milling treatment with iron roll rice mills for 4 times.

In one embodiment of the disclosure, the rice hulling refers to a process of removing the hulls of paddy.

In one embodiment of the disclosure, the main ingredients of the non-aleurone component are broken rice, cortices and rice germs.

In one embodiment of the disclosure, the aleurone component contains a rice aleurone layer, a sub-aleurone layer and part of rice grist as the main ingredients.

In one embodiment of the disclosure, the rice aleurone contains a rice aleurone layer and a sub-aleurone layer as the main ingredients, and is a product obtained by removing rice grist from the aleurone component.

In one embodiment of the disclosure, the brown rice in the step (1) is mechanically milled by one or more emery rolls or iron rolls or a combined process.

In one embodiment of the disclosure, the sieving mesh of the ultrasonic vibrating screen is preferably 60-80 meshes in step (1).

Further, the sieving mesh number is preferably 60 meshes in step (1).

In one embodiment of the disclosure, the sieving is performed using an ultrasonic vibrating screen in step (1).

In one embodiment of the disclosure, the separation method of the disclosure specifically includes the following steps:

(1) In the process of rice processing, after being hulled, paddy enters a mechanical rice milling process, and the rice milling process adopts a process with "four emery rolls", "three emery rolls and one iron roll", "two emery rolls and two iron rolls", "one emery roll and three iron rolls", or "four iron rolls", or other combined processes with emery rolls and iron rolls. After mechanical milling, a rice bran component is separated in a No. 2 fan unit.

(2) The rice bran component obtained in step (1) is pneumatically conveyed to a tangential injection airflow impeller classifier to perform aleurone component separation to obtain an aleurone component mainly including an aleurone layer and a non-aleurone component mainly including a non-aleurone layer. The design structure diagram and classification principle of the tangential injection airflow impeller classifier are shown in FIG. 12. The difference between the equipment and ordinary equipment is that a single or multiple tangential airflow injection holes are designed on the cylindrical shell wall of an impeller section. The purpose is to solve the problem that in the classification process, due to the centrifugal force generated by high-speed rotation of an impeller, part of broken rice and a crude fiber component are thrown to the periphery, and at the same time, part of the aleurone component is adhered, entrained and thrown to the periphery. In order to completely separate the aleurone component agglomerated and entrained around the broken rice and the crude fiber, a single or several injection airflows are injected tangentially from the shell to fully disperse the broken rice and the crude fiber. Furthermore, the aleurone component entrained and adhered in the broken rice and the crude fiber is completely separated, and the separation rate of the aleurone layer is improved.

(3) The aleurone component obtained in step (2) is further classified using an ultrasonic vibrating screen to remove the remaining part of rice grist. The mesh number of the screen is 60-80 meshes, and the component under the screen is collected to obtain rice aleurone.

(4) Clean domestic drinking water is sprayed into the rice aleurone obtained in step (3) in a mixer while stirring is performed, and the amount of water added is 5%-15% of the rice aleurone. The rice aleurone is uniformly mixed quickly in the mixer to ensure that the water is evenly distributed in the rice aleurone. The purpose of adding water in the step is to enhance heat transfer.

(5) The rice aleurone after water is added in step (4) is conveyed into steam treatment equipment by a conveyor belt. The distribution thickness of the rice aleurone on the conveyor belt is controlled to be 1-5 cm, the steam temperature is controlled at 95° C.-120° C., and the steam treatment time is 20-40 min.

(6) The rice aleurone obtained after the steam treatment in step (5) is automatically discharged to a stirring tank through a conveyor belt, water is added to the stirring tank and the slurry is quickly beaten. The concentration of the rice aleurone slurry is controlled at 25%-50%.

(7) The rice aleurone slurry obtained in step (6) is treated by colloidal milling, and then conveyed to drum scraper drying equipment by a pump to perform drying. The steam pressure is controlled at 0.6-0.8 Mpa, the motor speed is controlled at 50-300 rpm, and the dried material is collected.

(8) The dried material collected in step (7) is pulverized to 100-300 meshes by an ultrafine pulverizer, and packaged to obtain the stabilized rice aleurone.

The disclosure further discloses stabilized rice aleurone prepared by the above method.

The disclosure further discloses an application of the above rice aleurone in the food field.

The disclosure also discloses applications of the above rice aleurone in the fields of instant cereal products, solid beverages, baked products, snack foods, meal replacement powders, rice and flour products and other functional food ingredients.

The stabilized rice aleurone prepared by the method of the disclosure has a lipase inactivation rate of 85% or more, a peroxidase inactivation rate of 100%, a fatty acid value stabilized below 50 mg (KOH)/100 g, and a storage period of 12 months or more at room temperature (23-35° C.). The product has good taste, no change in color, low process cost and low investment, and can be used in industrial production and application in food field.

The disclosure uses the technology of classifying a rice aleurone layer by a tangential injection airflow impeller classifier combined with an ultrasonic vibrating screen for the first time, and the extraction rate of the rice aleurone layer reaches 80% or more. Simultaneously, the disclosure uses steam treatment coupled with thermal enzyme inactivation by drum drying as a stabilization method for the first time, and enables the drum drying equipment to realize two purposes of enzyme inactivation and drying. The disclosure has short process flow, simple equipment, high utilization rate of equipment, small floor space, low investment, low energy consumption and no pollution, and is suitable for industrial promotion. By using the method of the disclosure to produce the stabilized rice aleurone, the shortcomings of poor enzyme inactivation stabilization effect, incomplete enzyme inactivation, and unstable product quality of a single process are overcome, the shortcomings of a twin-screw extrusion process that although the stabilization effect is good, the taste of the product is poor are overcome, and the taste and shelf life of the product are guaranteed.

The stabilized rice aleurone produced by the technology of the disclosure has the characteristic of good stabilization effect and also the characteristic of high nutritional value, is rich in functional ingredients such as dietary fiber, B vitamins, vitamin E, phenolic acid and mineral elements, and can be used as a raw material for functional food development.

After in-depth research, the disclosure develops a stabilization process for rice aleurone, and solves the problems including high input of machinery, power and the like, poor product sensory quality and taste, chemical reagent residue caused by a chemical stabilization method in the stabilization treatment of rice aleurone in the existing rice bran stabilization method. In addition, the aleurone product obtained in the disclosure has a storage period up to 12 months at room temperature, and has the characteristics of stable product, no color change and good taste. At the same time, the process has the characteristics of short process flow, low energy consumption, low equipment investment and easy industrial promotion, and can use a drum scraper dryer to realize dual purposes of enzyme inactivation and drying.

DETAILED DESCRIPTION

The technical solution of the disclosure will be described in detail below with reference to the drawings and specific embodiments:

Example 1

Figure 11:
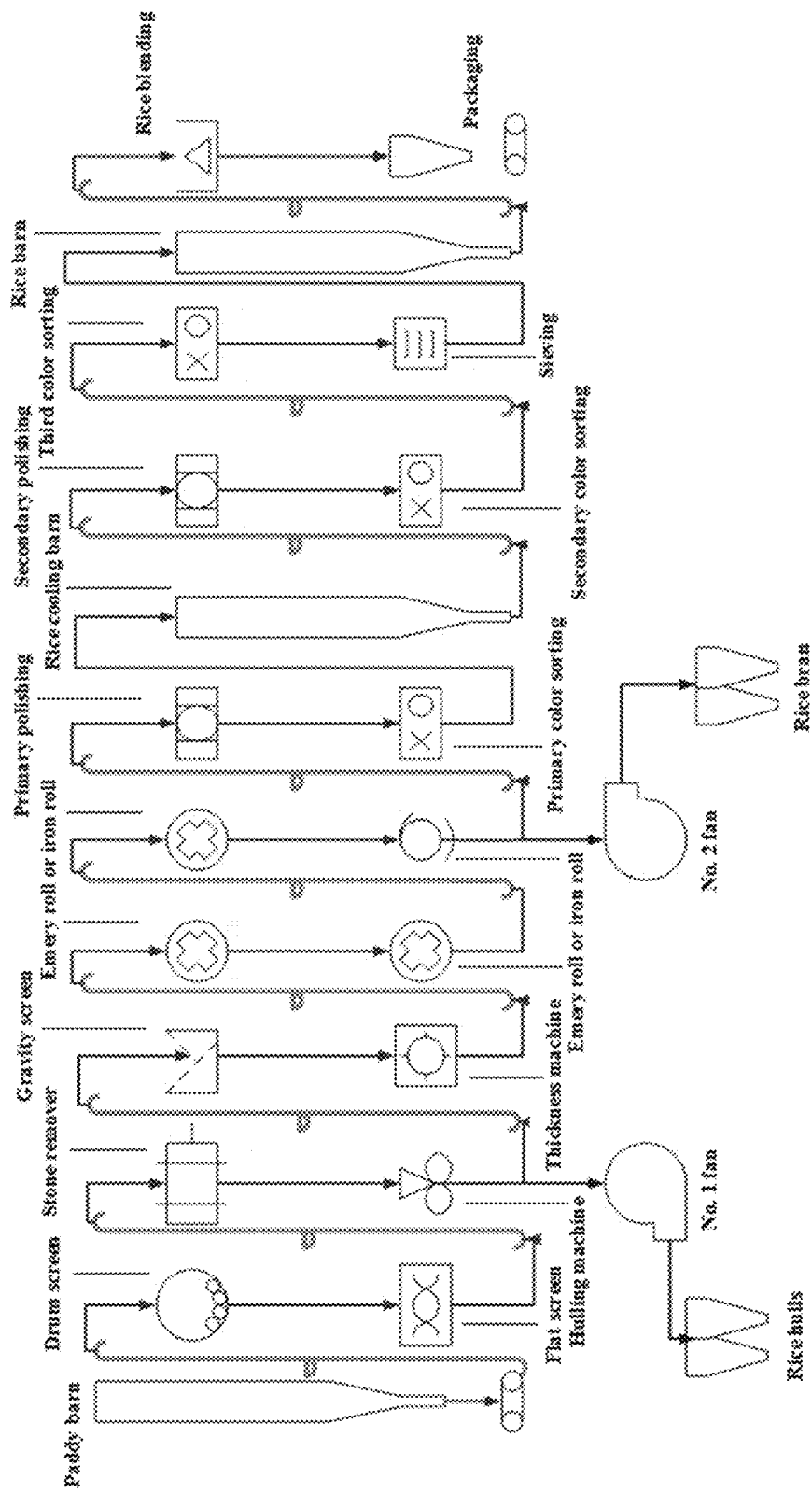
FIG. 11 is a flow chart of a rice processing technology.
Figure 12:
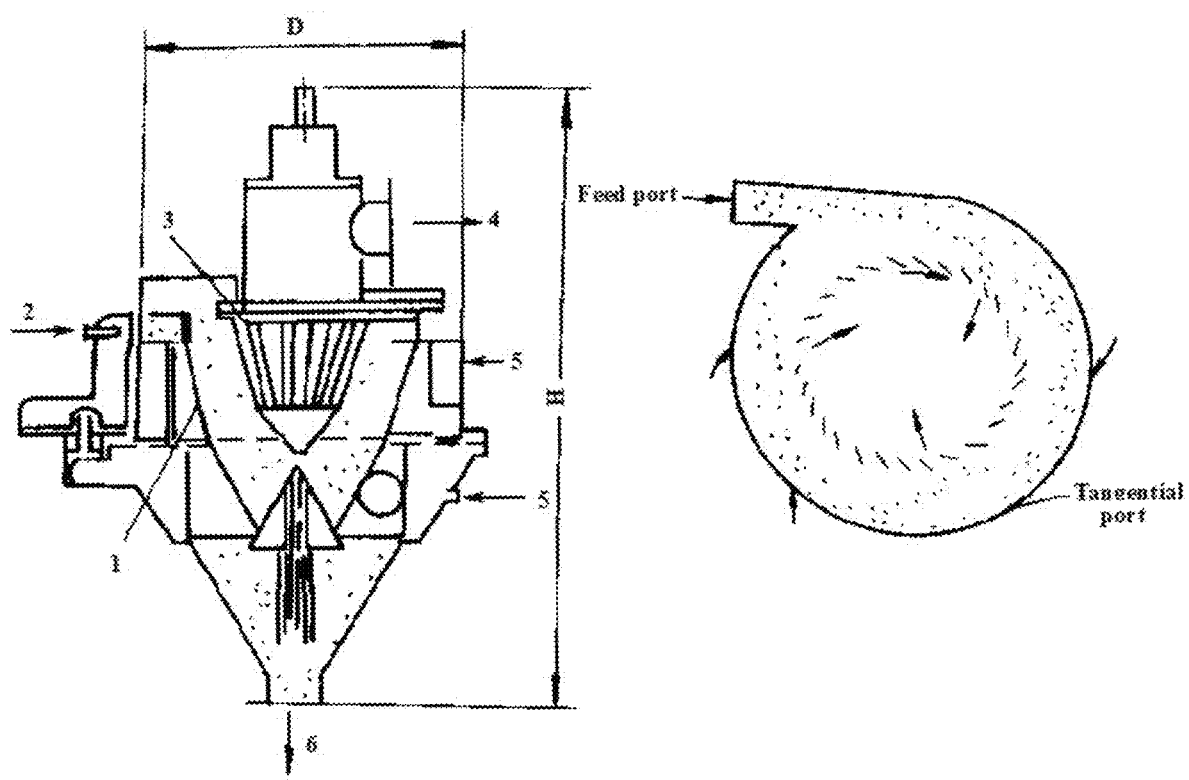
FIG. 12 is the classification principle diagram of the tangential injection airflow impeller classifier: the left diagram is the structural diagram (left), wherein 1—cylinder body, 2—feed port, 3—classification impeller, 4—aleurone component outlet, 5—air inlet, and 6—non-aleurone component outlet; and the right diagram is the classification principle diagram.

(1) FIG. 11 is a processing process of rice in the present example: Paddy was first conveyed from a barn to a preliminary cleaning screen of a drum (purchased from Hubei Changfeng Grain Machinery Co., Ltd., model TSCY100) by a bucket elevator, and part of large impurities were removed by the preliminary cleaning screen of the drum. Then the paddy entered a flat rotary screen (purchased from Hubei Changfeng Grain Machinery Co., Ltd., model TQLM150), and residual straw and other impurities were removed through the flat rotary screen. Then the paddy entered a suction specific gravity stone remover (purchased from Hubei Changfeng Grain Machinery Co., Ltd., model TQSX 168) to remove sand, gravel and other impurities to obtain clean paddy, and the clean paddy entered a hulling process. The paddy is hulled and separated to obtain brown rice by a pneumatic rubber roller hulling machine (purchased from Hubei Changfeng Grain Machinery Co., Ltd., model MLGQ51-C), and then the brown rice entered a mechanical rice milling process. The brown rice was milled by a vertical emery roll rice mill (purchased from Satake Machinery (Suzhou) Co., Ltd., model VTA10AB-C) and an iron roll rice mill (purchased from Satake Machinery (Suzhou) Co., Ltd., model VBF10A-C/MC) in the mechanical rice milling process, and after the grain bran separation, rice and rice bran were obtained. The rice after the grain bran separation was polished and color sorted to remove chalky grains and variegated grains, and finally sieved to remove broken rice to obtain polished rice.

In the process of rice processing, after hulling, paddy entered the mechanical rice milling process, the rice milling process adopts a process with "three emery rolls and one iron roll", and the brown rice was milled by 3 vertical emery roll rice mills and 1 iron roll rice mill. After mechanical milling, the rice bran component was separated at fan equipment (No. 2 fan unit, purchased from Shanghai Xingying Electromechanical Co., Ltd., model 9-19).

(2) The rice bran component obtained in step (1) was pneumatically conveyed to a tangential injection airflow impeller classifier (purchased from Shandong Dalier Heavy Industry Co., Ltd., model AF315-6) to perform aleurone component separation to obtain an aleurone component mainly including an aleurone layer and a non-aleurone component mainly including a non-aleurone layer.

(3) The aleurone component obtained in step (2) was further classified using an ultrasonic vibrating screen (purchased from Xinxiang Dayong Vibration Equipment Co., Ltd., model DYC2000) to remove the remaining part of rice grist. The mesh number of the screen is 60 meshes, and the component under the screen is collected to obtain rice aleurone.

(4) Clean domestic drinking water was sprayed into the rice aleurone obtained in step (3) in a mixer (purchased from Nanjing Kedixin Machinery Equipment Co., Ltd., model CH-200) while stirring is performed, and the amount of water added is 10% of the rice aleurone. The rice aleurone was uniformly mixed quickly in the mixer to ensure that the water was evenly distributed in the rice aleurone. The purpose of adding water in the step is to enhance heat transfer.

(5) The rice aleurone after water was added in step (4) was conveyed into steam treatment equipment (purchased from Shandong Kingdealer Industrial Equipment Co., Ltd., model KD-ZX) by a conveyor belt. The distribution thickness of the rice aleurone on the conveyor belt is controlled to be 3 cm, the steam temperature is controlled at 100° C., and the steam treatment time is 20 min.

(6) The rice aleurone after the steam treatment obtained in step (5) was automatically discharged to a stirring tank through a conveyor belt, water was added to the stirring tank and the slurry was quickly beaten. The concentration of the rice aleurone slurry was controlled at 30%.

(7) The rice aleurone slurry obtained in step (6) was treated by colloidal milling, and then conveyed to drum scraper drying equipment (purchased from Dongtai Food Machinery Factory Co., Ltd., model HG-1800A) by a pump to perform drying. The steam pressure was controlled at 0.65 Mpa, the motor speed was controlled at 300 rpm, and the dried material was collected.

(8) The dried material collected in step (7) was pulverized to 100-300 meshes by an ultrafine pulverizer (purchased from Jiangyin Shengtian Machine Manufacturing Co., Ltd., model STWF-60), and packaged to obtain the stabilized rice aleurone.

Figure 1:
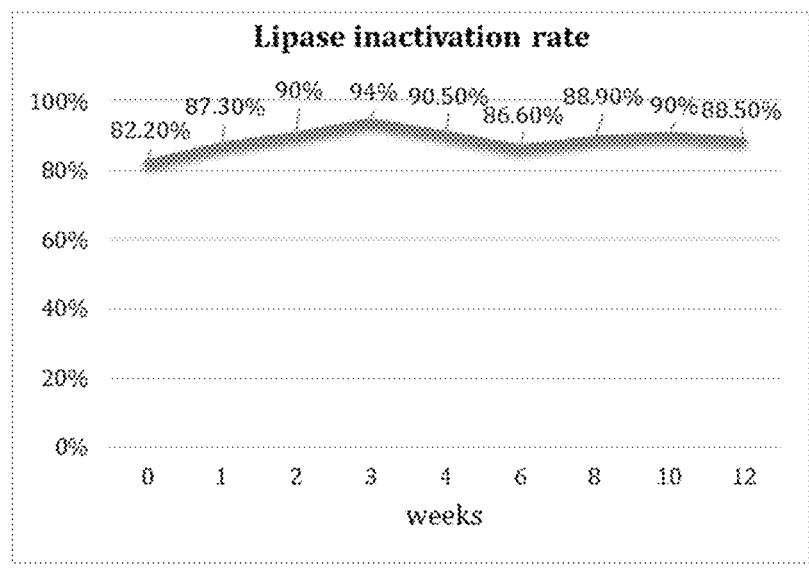
FIG. 1 shows the changes in the activity of lipase and peroxidase in the rice aleurone obtained in Example 1 after the product is cultured in a constant temperature and humidity incubator at 50° C. and a relative humidity of 60% for 12 weeks.
Figure 1:
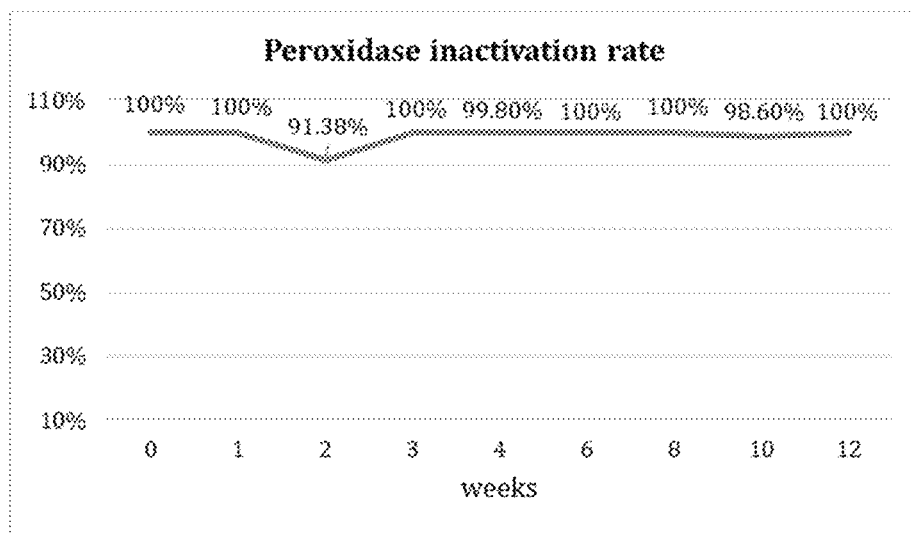
Figure 2:
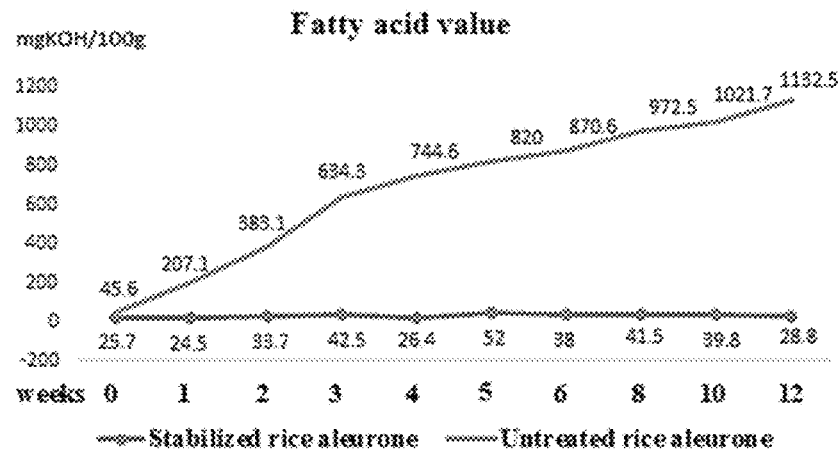
FIG. 2 shows the change in the fatty acid value of the rice aleurone obtained in Example 1 after the product is cultured in a constant temperature and humidity incubator at 50° C. and a relative humidity of 60% for 12 weeks.

After detection, the stabilized rice aleurone obtained by the method has a free fatty acid value of 23.7 mg KOH/100 g, a lipase inactivation rate of 85% or more, a peroxidase inactivation rate of 100%, and a shelf life of 12 months or more (as shown in FIGS. 1 and 2), and the problem that rice aleurone is very easy to be rancid is solved.

After detection, the stabilized rice aleurone obtained by the method has a total number of colonies of 26 CFU/g, coliform bacteria were not detected, molds and yeasts were not detected, pathogens were not detected, aflatoxin B1 was not detected, and ochratoxin was not detected. The taste is pure, and the health and safety indexes meet the national food standards (as shown in Table 1).

The stabilized rice aleurone prepared by the method is analyzed for nutritional functional components. The product is rich in protein, dietary fiber, B vitamins, vitamin E, phenolic acids, mineral elements and other functional components (as shown in Table 2). Moreover, the stabilization treatment has little effect on the nutritional functional components, and the stabilized rice aleurone can be used as a raw material for functional food development.

TABLE 1

Detection results of safety indexes of rice aleurone

| Safety indexes | Detection results |
|---|---|
| Total number of colonies | <100 CFU/g |
| Coliform bacteria | Not detected |
| Mold and yeast | Not detected |
| Aflatoxin B1 | Not detected |
| Ochratoxin A | Not detected |

TABLE 2

Nutrient content of rice aleurone of Example 1 and comparison with polished rice

| Nutrient | Content in stabilized rice aleurone | Content in polished rice | Ratio of content in stabilized rice aleurone and polished rice | Content in non-stabilized rice aleurone |
|---|---|---|---|---|
| Protein/% | 16.2 | 7.5 | 2.2:1 | 15.7 |
| Fat/% | 7.4 | 0.7 | 10.6:1 | 7.2 |
| Starch/% | 63.2 | 70.1 | 0.9:1 | 64.3 |
| Dietary fiber/% | 10.1 | 0.7 | 14.4:1 | 9.6 |
| Vitamin B1/(mg/kg) | 11.0 | 1.4 | 7.9:1 | 11.2 |
| Vitamin B2/(mg/kg) | 1.2 | 0.5 | 2.4:1 | 1.1 |
| Vitamin E/(mg/kg) | 5 | / | / | 4.8 |
| GABA/(mg/kg) | 599.2 | 299.5 | 2.0:1 | 594.7 |
| Phytic acid/(g/kg) | 14.5 | 1.2 | 12.1:1 | 13.8 |
| Ferulic acid/(mg/kg) | 1262.7 | 124.6 | 10.2:1 | 1247.9 |
| P-Coumaric acid/(mg/kg) | 231.8 | / | / | 210.7 |

TABLE 2-continued

Nutrient content of rice aleurone of Example 1 and comparison with polished rice

| Nutrient | Content in stabilized rice aleurone | Content in polished rice | Ratio of content in stabilized rice aleurone and polished rice | Content in non-stabilized rice aleurone |
|---|---|---|---|---|
| Phosphorus/(mg/kg) | 13371.6 | 1230.2 | 10.9:1 | 13156.0 |
| Calcium/(mg/kg) | 527.3 | 40.1 | 13.2:1 | 531.4 |
| Magnesium/(mg/kg) | 6736.4 | 200.2 | 33.6:1 | 6802.0 |
| Iron/(mg/kg) | 61.4 | 7.1 | 8.7:1 | 55.8 |
| Zinc/(mg/kg) | 36.9 | 9.7 | 3.8:1 | 33.5 |
| Copper/(mg/kg) | 18.4 | 2.6 | 7.1:1 | 17.7 |
| Manganese/(mg/kg) | 107.1 | 10.7 | 10:01 | 97.4 | wherein the polished rice refers to commercially available pre-packaged rice.

Shelf Life Experiment (Accelerated Test):

The product was cultured in a constant temperature and humidity incubator at 50° C. and a relative humidity of 60% for 12 weeks, and the lipase activity, peroxidase activity and fatty acid value of the product were regularly tested. The results are shown in FIGS. 1A and B.

Figure 3:
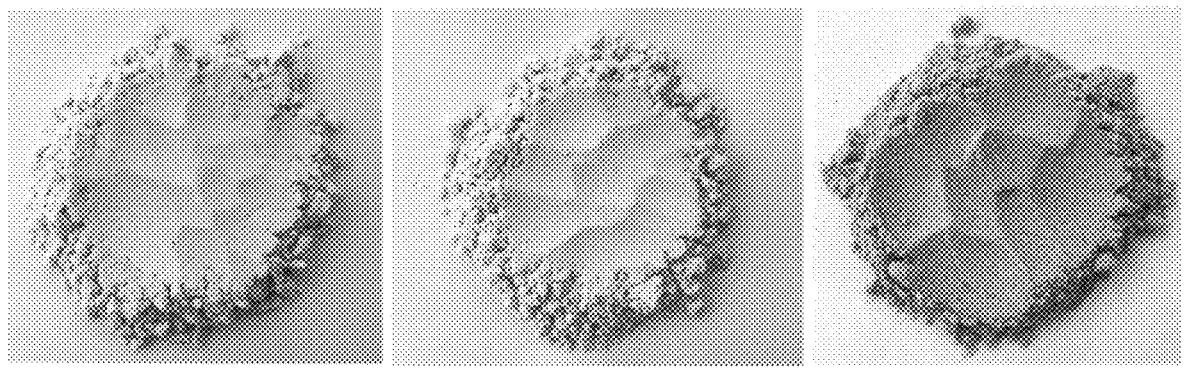
FIG. 3 shows the change in the color of rice aleurone after storage: fresh rice aleurone raw material (left); rice aleurone of Example 1 stored at 50° C. and a relative humidity of 60% for 12 weeks (middle); and untreated rice aleurone in step 1 of the example stored at 50° C. and a relative humidity of 60% for 12 weeks (right).

In the stabilized rice aleurone of the present example, the peroxidase inactivation rate is 100%, and the lipase inactivation rate is 85% or more. After 12 weeks of culture in a constant temperature and humidity incubator at 50° C. and a relative humidity of 60%, the free fatty acid value of the stabilized rice aleurone is always stable below 50 mg KOH/100 g (as shown in FIG. 2). The stabilization effect is better than the stabilization effect reported in the current literature and patents. On sensory quality, the stabilized rice aleurone produced by the method does not change in color and maintains the original color of the product, as shown in the middle picture in FIG. 3.

Storage at 50° C. and a relative humidity of 60% for 1 week is equivalent to storage at room temperature (23-35° C.) for 1 month. That is, the product of the example can be stored at room temperature for 12 months without being rancid.

After untreated rice aleurone (the aleurone obtained in step 1) was stored at 50° C. and a relative humidity of 60% for 12 weeks, the color of the rice aleurone was found to darken (as shown in the right picture in FIG. 3), the fatty acid value was high, and the rice aleurone was rancid.

Example 2

Process Optimization

1) Selection of the Amount of Water Added in Step (2):

5 parts of the rice aleurone obtained in step (3) of Example 1 were taken, and 2 wt %, 5 wt %, 10 wt %, 15 wt % and 20 wt % water was added according to the mass percentage respectively, and the rice aleurone and water were mixed uniformly. The uniformly mixed rice aleurone was spread on steamer trays to a thickness of 3 cm, and steamed at 100° C. for 20 min. The residue of the lipase and peroxidase activity was detected respectively, and the results are shown in FIG. 4.

The addition of water to rice aleurone can enhance heat transfer, thereby improving the enzyme inactivation effect and reducing energy consumption costs. Insufficient water addition cannot achieve the heat transfer enhancing effect. Too much water addition will cause the viscosity of the sample to increase, the heat transfer effect will deteriorate, the enzyme inactivation effect will deteriorate, and the product will become discolored.

Figure 4:
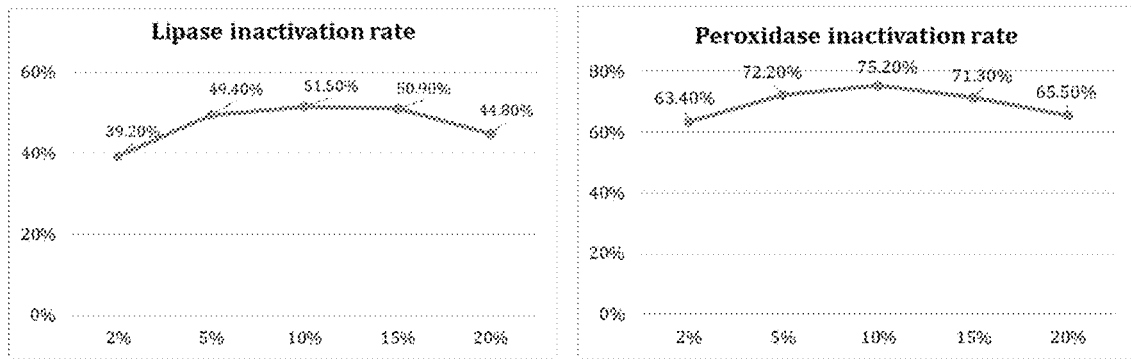
FIG. 4 shows the effect of the amount of water added on the activity of lipase and peroxidase.

It can be seen from FIG. 4 that when the amount of water added is 10%, the inactivation rates of lipase and peroxidase both reach the highest value. As the amount of water added increases, the enzyme inactivation rate does not increase any more; when the amount of water sprayed is higher than 15%, the color of the product changes significantly, which is not conducive to the product sensory quality and sales. Considering comprehensively, the parameter of the amount of water added is most preferably 10%, and less preferably 5%.

2) Selection of Thickness of Rice Aleurone During Steam Treatment in Step (2):

5 parts of the rice aleurone obtained in step (3) of Example 1 were taken, 10 wt % clean domestic drinking water was sprayed according to the mass percentage, and the rice aleurone and water were mixed uniformly. The uniformly mixed rice aleurone was spread on steamer trays to a thickness of 2 cm, 3 cm, 4 cm, 5 cm and 6 cm, and steamed at 100° C. for 20 min. The residue of the lipase and peroxidase activity was detected respectively, and the results are shown in FIG. 5.

Figure 5:
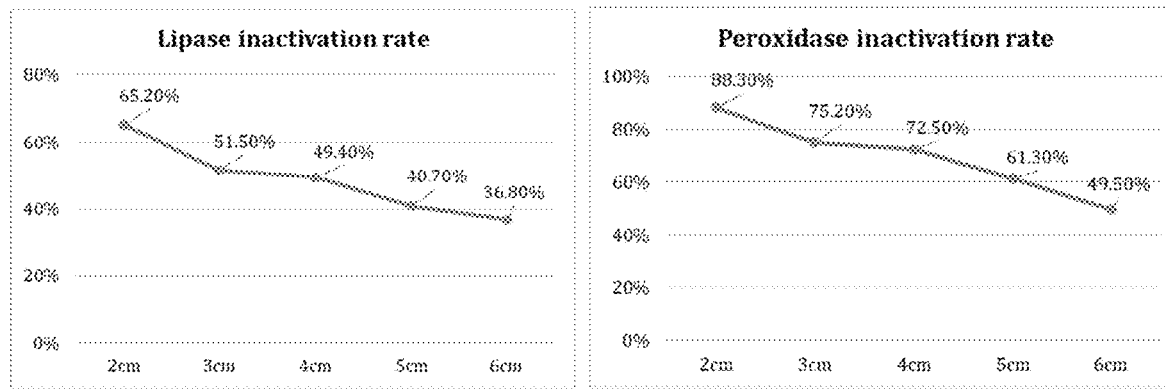
FIG. 5 shows the effect of the thickness of rice aleurone on the activity of lipase and peroxidase.

It can be seen from FIG. 5 that the spreading thickness of the rice aleurone will affect the steam penetration effect and the enzyme inactivation effect. With the increase in the spreading thickness of the rice aleurone, the inactivation rate of the lipase and peroxidase gradually decreases. The ranges of 2-3 cm and 4-6 cm have a significant decrease, while the range of 3-4 cm has a small decrease. Although the thickness of 2 cm has a good enzyme inactivation effect, a decrease in production efficiency and an increase in energy consumption will be caused. Comprehensively considering the efficiency, energy consumption and enzyme inactivation effect, the most preferred spreading thickness of the rice aleurone is 3 cm, and the less preferred thickness is 4 cm.

3) Selection of Temperature During Steam Treatment in Step (2):

5 parts of the rice aleurone obtained in step (3) of Example 1 were taken, 10 wt % clean domestic drinking water was sprayed according to the mass percentage, and the rice aleurone and water were mixed uniformly. The uniformly mixed rice aleurone was spread on steamer trays to a thickness of 3 cm, and steamed at 90° C., 100° C., 105° C. and 110° C. for 20 min respectively. The residue of the lipase and peroxidase activity was detected respectively, and the results are shown in FIG. 6.

The higher the steam temperature, the stronger the heat penetration, and theoretically the better the enzyme inactivation effect. However, high-temperature and high-pressure steam can also cause the Maillard reaction of the rice aleurone to cause discoloration of the product, which is not conducive to product sales. At the same time, high temperature and high pressure have high equipment requirement and high cost.

Figure 6:
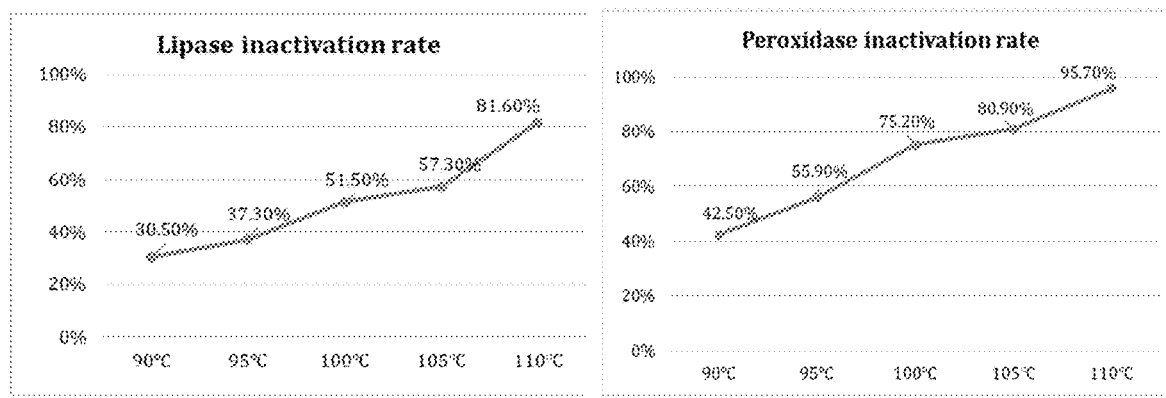
FIG. 6 shows the effect of steam temperature on the activity of lipase and peroxidase.

It can be seen from FIG. 6 that as the temperature increases, the inactivation rate of lipase and peroxidase gradually increases. Although the enzyme inactivation rate increases significantly after 105° C., the product is severely discolored, which seriously affects the product sensory quality and sales. In addition, high temperature and high pressure have high equipment requirement and high costs. Comprehensively considering the enzyme inactivation effect and the impact on the product, as well as equipment and cost, the steam temperature is most preferably 100° C., and less preferably 105° C.

4) Selection of Time in Steam Treatment in Step (2):

5 parts of the rice aleurone obtained in step (3) of Example 1 were taken, 10 wt % clean domestic drinking water was sprayed according to the mass percentage, and the rice aleurone and water were mixed uniformly. The uniformly mixed rice aleurone was uniformly spread on steamer trays to a thickness of 3 cm respectively, and treated at 100° C. for 10 min, 15 min, 20 min, 25 min and 30 min respectively. The residue of the lipase and peroxidase activity was detected respectively, and the results are shown in FIG. 7.

The longer the steam treatment time, theoretically the better the enzyme inactivation effect. However, if the time is too long, on the one hand, discoloration of the rice aleurone product will be caused, which is not conducive to product sales, and on the other hand, high process cost will be caused.

Figure 7:
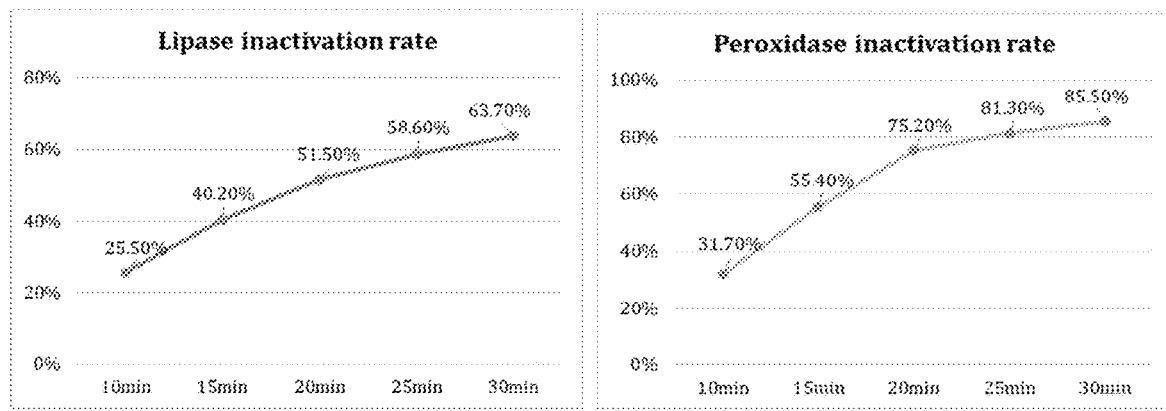
FIG. 7 shows the effect of steam treatment time on the activity of lipase and peroxidase.

It can be seen from FIG. 7 that as the steam treatment time is extended, the inactivation rate of the lipase and peroxidase gradually increases. However, the color of the product changes after 25 min and changes significantly after 30 min, affecting the product sensory quality and sales. Comprehensively considering the enzyme inactivation effect, product sensory quality and cost, the most preferred steam treatment time is 20 min, and the less preferred time is 25 min.

4-Factor 3-Level Orthogonal Experiments Were Performed on the Amount of Water Added, Thickness, Temperature and Time to Determine the Most Preferred Solution of Steam Treatment. The Results are Shown in Table 3.

Combining FIGS. 4-7 and Table 3, it can be seen that the most preferred solution for steam treatment is: amount of water added: 10%, thickness: 3 cm, temperature: 100° C., and time: 20 min; and the less preferred solution is: amount of water added: 10%, thickness: 4 cm, temperature: 100° C., and time: 25 min. Through treatment by the most preferred solution, the lipase inactivation rate of rice aleurone is 51.5% and the peroxidase inactivation rate is 75.2%.

5) Selection of Parameters of the Drum Scraper Dryer in Step (4):

Selection of motor speed parameter:

5 parts of rice aleurone after steam treatment by the most preferred solution were taken, 10 wt % clean domestic drinking water was sprayed according to the mass percentage, and the rice aleurone and water were mixed uniformly. The uniformly mixed rice aleurone was uniformly spread on steamer trays to a thickness of 3 cm respectively, and treated at 100° C. for 20 min respectively.

Water was added respectively to prepare slurry, and the slurry concentration was controlled at about 35%. After colloid milling, the slurry was dried in a drum at the steam pressure of 0.7 MPa and the motor speeds of 100 rpm, 200 rpm, 300 rpm, 400 rpm and 500 rpm respectively. Samples were collected, and the residue of lipase and peroxidase activity was detected respectively. The results are shown in FIG. 8.

Figure 8:
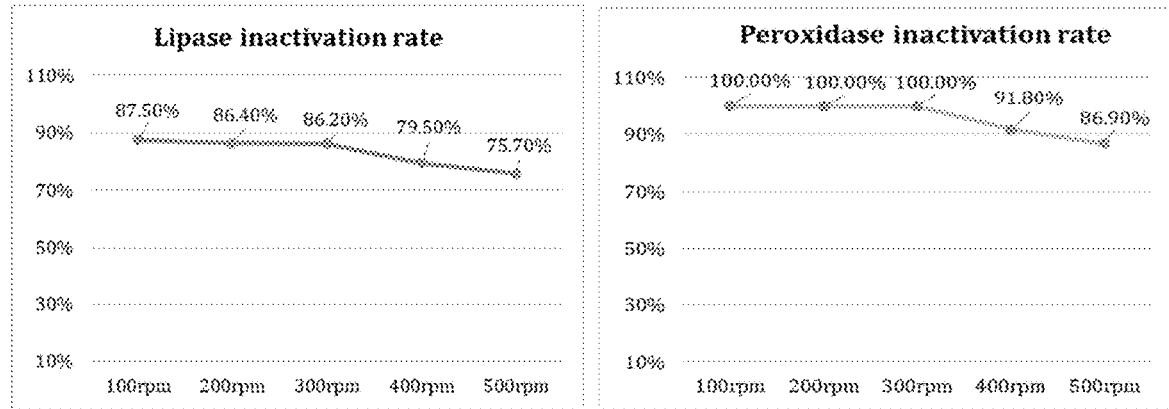
FIG. 8 shows the effect of the motor speed of the drum scraper dryer on the activity of lipase and peroxidase.

It can be seen from the results in FIG. 8 that in the speed range of 100-300 rpm, the enzyme inactivation effect is the best, the peroxidase inactivation rate is as high as 100%, and the lipase inactivation rate is as high as 85% or more. However, the lower the motor speed, the lower the efficiency, and the higher the cost. Comprehensively considering the enzyme inactivation effect and cost, the motor speed is most preferably 300 rpm, and less preferably 200 rpm or 400 rpm.

TABLE 3

Effects of different factors on steam treatment of rice aleurone

| | A | | | | Results | | | |
|---|---|---|---|---|---|---|---|---|
| No. | Amount of water added/% | B Thickness/ cm | C Temperature/ ° C. | D Time/ min | Lipase inactivation rate/% | Peroxidase inactivation rate/% | Sensory quality | Overall ratings |
| 1 | 5.0 | 3.0 | 95.0 | 15.0 | 35.20% | 43.50% | — | 5.5 |
| 2 | 5.0 | 4.0 | 100.0 | 20.0 | 47.60% | 76.70% | — | 7.3 |
| 3 | 5.0 | 5.0 | 105.0 | 25.0 | 42.50% | 64.70% | Color damaged | 5.7 |
| 4 | 10.0 | 3.0 | 100.0 | 25.0 | 58.60% | 81.30% | — | 9.1 |
| 5 | 10.0 | 4.0 | 105.0 | 15.0 | 51.50% | 75.30% | Color damaged | 8.2 |
| 6 | 10.0 | 5.0 | 95.0 | 20.0 | 29.70% | 36.40% | — | 5.3 |
| 7 | 15.0 | 3.0 | 105.0 | 20.0 | 47.90% | 65.40% | Color damaged | 7.2 |
| 8 | 15.0 | 4.0 | 95.0 | 25.0 | 28.80% | 35.20% | — | 6.2 |
| 9 | 15.0 | 5.0 | 100.0 | 15.0 | 46.40% | 61.50% | — | 7.1 |
| K1 | 18.50 | 21.80 | 17.00 | 20.80 | | | | |
| K2 | 22.60 | 21.70 | 23.50 | 19.80 | | | | |
| K3 | 20.50 | 18.10 | 21.10 | 21.00 | | | | |
| k1 | 6.17 | 7.27 | 5.67 | 6.93 | | | | |
| k2 | 7.53 | 7.23 | 7.83 | 7.70 | | | | |
| k3 | 6.83 | 6.03 | 7.03 | 7.00 | | | | |
| R | 1.37 | 1.23 | 2.17 | 0.77 | | | | |
| Priority order of factors | Temperature-Amount of water added-Thickness-Time | | | | | | | |
| Most preferred solution | C2A2B1D2 | | | | | | | | wherein the calculation method of the overall rating is: the overall rating is obtained by the enzyme inactivation effect rating plus the sensory evaluation rating: overall rating=lipase inactivation rate×5+peroxidase inactivation rate×5+sensory evaluation rating.

A2 refers to the level 2 of A factor, which is 10%, and so on.

Selection of steam pressure parameters of the drum scraper dryer:

5 parts of rice aleurone after steam treatment by the most preferred solution were taken, 10 wt % clean domestic drinking water was sprayed according to the mass percentage, and the rice aleurone and water were mixed uniformly. The uniformly mixed rice aleurone was uniformly spread on steamer trays to a thickness of 3 cm respectively, and treated at 100° C. for 20 min respectively.

Water was added respectively to prepare slurry, and the slurry concentration was controlled at about 35%. After colloid milling, the slurry was dried in a drum at the motor speed of 300 rpm and steam pressure of 0.55 MPa, 0.6 MPa, 0.65 MPa, 0.7 MPa, and 0.75 MPa respectively. Samples were collected, and the residue of lipase and peroxidase activity was detected respectively. The results are shown in FIG. 9.

Figure 9:
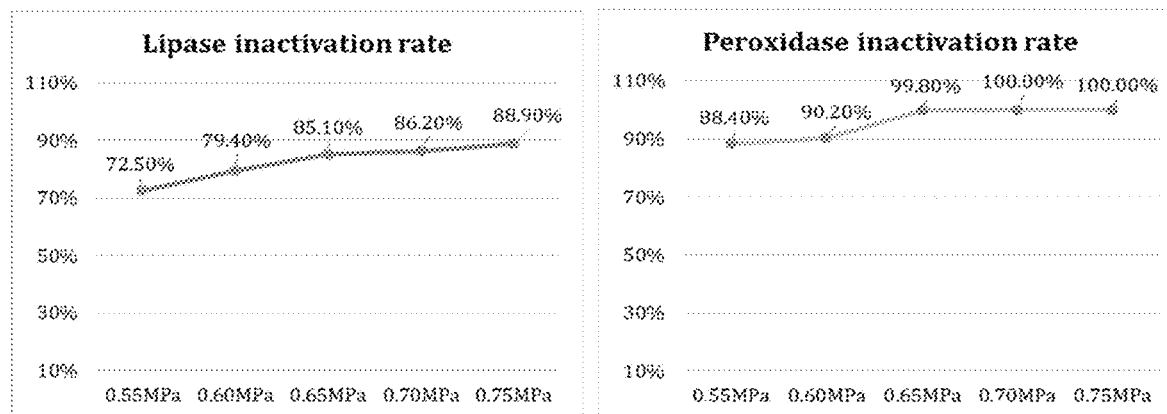
FIG. 9 shows the effect of the steam pressure of the drum scraper dryer on the activity of lipase and peroxidase.

It can be seen from the results in FIG. 9 that at about 0.7 MPa, the enzyme inactivation effect is the best, the peroxidase inactivation rate is as high as 100%, and the lipase inactivation rate is as high as 85% or more. However, the higher the steam pressure, the higher the cost and the higher the equipment requirement. Comprehensively considering the enzyme inactivation effect, cost and equipment requirement, the steam pressure is most preferably 0.65 MPa, and less preferably 0.7 MPa.

6) Selection of Sieving Mesh Number in Step (3):

Phytic acid is one of the iconic components of the aleurone layer. The higher the purity of the aleurone layer in rice aleurone, the higher the content of phytic acid. In the present example, the mesh number of the vibrating screen was comprehensively determined by the phytic acid content and the utilization rate of rice aleurone.

Referring to Example 1, other conditions remained unchanged, only the mesh number of the ultrasonic vibrating screen in step (3) was replaced with 40, 60, 80 and 100 mesh screens for performing sieving. Rice aleurone was collected separately, and the phytic acid content and the aleurone yield were determined respectively. The results are shown in FIG. 10.

Figure 10:
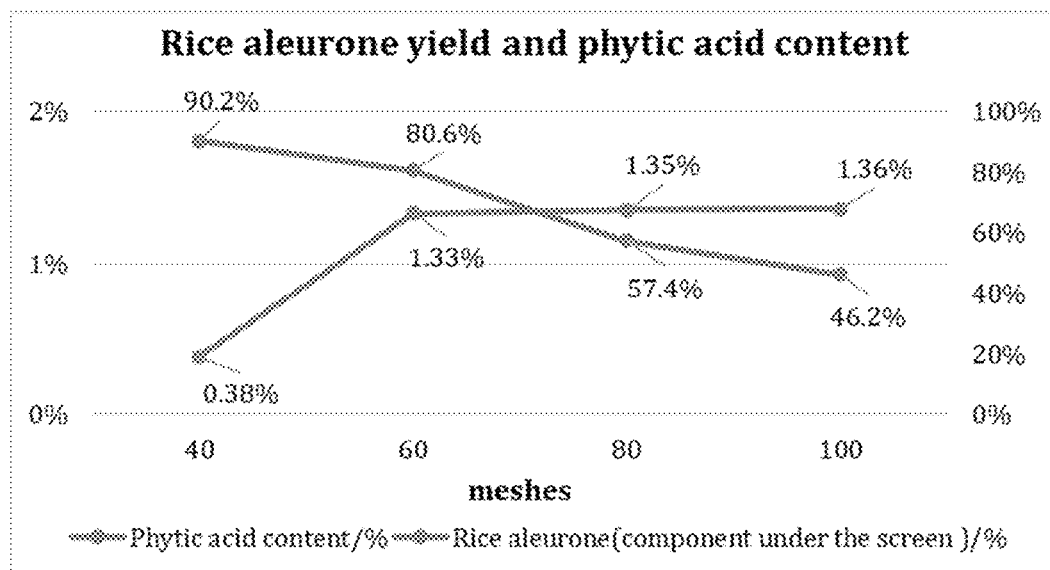
FIG. 10 shows the effect of different sieving meshes on the separating effect of rice aleurone.

It can be seen from FIG. 10 that the phytic acid content of the rice aleurone collected after sieving by the 60 mesh screen reaches the maximum, the phytic acid content of the 60-80 mesh fraction does not change much, but the yield of the 60-80 mesh rice aleurone is significantly reduced. Comprehensively considering the content and utilization rate of the rice aleurone layer (that is, the production efficiency and quality of the product), the mesh number of the vibrating screen is most preferably 60 meshes, and less preferably 80 meshes.

The disclosure uses the technology of classifying a rice aleurone layer by a tangential injection airflow impeller classifier combined with an ultrasonic vibrating screen for the first time, uses steam treatment coupled with thermal enzyme inactivation by drum drying as a stabilization method for the first time, and enables the drum drying equipment to realize two purposes of enzyme inactivation and drying. The disclosure has high utilization rate of the aleurone layer, stable product, short process flow, simple equipment, high utilization rate of equipment, small floor space, low investment, low energy consumption and no pollution, and is suitable for industrial promotion. By using the method of the disclosure to produce the stabilized rice aleurone, the shortcomings of poor enzyme inactivation stabilization effect, incomplete enzyme inactivation, and unstable product quality of a single process are overcome, the shortcomings of a twin-screw extrusion process that although the stabilization effect is good, the taste of the product is poor are overcome, and the taste and shelf life of the product are guaranteed.

The stabilized rice aleurone produced by the technology of the disclosure has the characteristic of good stabilization effect and also the characteristic of high nutritional value, is rich in functional ingredients such as dietary fiber, B vitamins, vitamin E, phenolic acid and mineral elements, and can be used as a raw material for functional food development.

What is claimed is:

1. A method for preparing rice aleurone, comprising the following steps:
   (1) after rice hulling and mechanical rice milling of paddy, obtaining rice and rice bran; classifying the rice bran into an aleurone component and a non-aleurone component by an air classifier, and further sieving and classifying the aleurone component to obtain crude rice aleurone;
   (2) mixing the crude rice aleurone obtained in step (1) with water to obtain a crude rice aleurone mixture, and subjecting the crude rice aleurone mixture to a steam treatment;
   (3) after the steam treatment, stirring the crude rice aleurone mixture with more water to obtain a rice aleurone slurry; and
   (4) adding the rice aleurone slurry to a drum scraper dryer, drying the rice aleurone slurry to obtain a dried rice aleurone, and then crushing the dried rice aleurone to obtain a rice aleurone product;
   wherein the aleurone component is further sieved and classified using an ultrasonic vibrating screen in the step (1), and a mesh number of the ultrasonic vibrating screen is in a range of 60-80 meshes;
   an amount of the water added is 5%-15% of mass of the crude rice aleurone in step (2);
   during the steam treatment, the crude rice aleurone mixture is distributed to a thickness of 1-5 cm in the step (2); a steam temperature during the steam treatment is controlled at 95° C.-120° C., and steam treatment time is 20-40 min in the step (2);
   a mass concentration of the rice aleurone slurry is 25%-50% in step (3);
   a steam pressure of the drum scraper dryer is 0.6-0.8 Mpa in step (4); and a motor speed of the drum scraper dryer is 50-300 rpm in the step (4).

2. A method for preparing rice aleurone, comprising the following steps:
   (1) after rice hulling and mechanical rice milling of paddy, obtaining rice and rice bran; classifying the rice bran into an aleurone component and a non-aleurone component by an air classifier, and further sieving and classifying the aleurone component to obtain crude rice aleurone;
   (2) mixing the crude rice aleurone obtained in step (1) with water to obtain a crude rice aleurone mixture, and subjecting the crude rice aleurone mixture to a steam treatment;
   (3) after the steam treatment, stirring the crude rice aleurone mixture with more water to obtain a rice aleurone slurry; and
   (4) adding the rice aleurone slurry to a drum scraper dryer, drying the rice aleurone slurry to obtain a dried rice aleurone, and then crushing the dried rice aleurone to obtain a rice aleurone product.

3. The method of claim 2, wherein the mechanical milling comprises milling by an emery roll rice mill process and/or an iron roll rice mill process in the step (1).

4. The method of claim 2, wherein the air classifier is a tangential injection airflow impeller pneumatic classifier.

5. The method of claim 4, wherein the tangential injection airflow impeller pneumatic classifier comprises tangential single-hole air injection or multi-hole air injection.

6. The method of claim 2, wherein the aleurone component is further sieved and classified using an ultrasonic vibrating screen in the step (1).

7. The method of claim 6, wherein a mesh number of the ultrasonic vibrating screen is in a range of 60-80 meshes.

8. The method of claim 2, wherein an amount of the water added is 5%-15% of mass of the crude rice aleurone in step (2).

9. The method of claim 2, wherein the steam treatment is to distribute the crude rice aleurone mixture to a thickness of 1-5 cm in step (2).

10. The method of claim 2, wherein a steam temperature during the steam treatment is controlled at 95° C.-120° C., and steam treatment time is 20-40 min in step (2).

11. The method of claim 2, wherein a mass concentration of the rice aleurone slurry is 25%-50% in step (3).

12. The method of claim 2, wherein the stirring further comprises a colloid milling treatment to obtain a more delicate rice aleurone slurry in step (3).

13. The method of claim 2, wherein a steam pressure of the drum scraper dryer is 0.6-0.8 Mpa in step (4).

14. The method of claim 2, wherein a motor speed of the drum scraper dryer is 50-300 rpm in step (4).

15. The method of claim 2, wherein a pulverization method adopted in step (4) is ultrafine pulverization, and a pulverization mesh number is 100-300 meshes.

* * * * *